(12) United States Patent
Siefert et al.

(10) Patent No.: US 10,994,361 B2
(45) Date of Patent: May 4, 2021

(54) STEPPED DESIGN WELD JOINT PREPARATION

(71) Applicant: Electric Power Research Institute, Inc., Palo Alto, CA (US)

(72) Inventors: John Albert Siefert, Huntersville, NC (US); Jonathan David Parker, Cornelius, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 848 days.

(21) Appl. No.: 15/113,294

(22) PCT Filed: Jan. 26, 2015

(86) PCT No.: PCT/US2015/012907
§ 371 (c)(1),
(2) Date: Jul. 21, 2016

(87) PCT Pub. No.: WO2015/112978
PCT Pub. Date: Jul. 30, 2015

(65) Prior Publication Data
US 2017/0008117 A1   Jan. 12, 2017

Related U.S. Application Data

(60) Provisional application No. 61/931,202, filed on Jan. 24, 2014.

(51) Int. Cl.
*B23K 9/23* (2006.01)
*B23K 33/00* (2006.01)
(Continued)

(52) U.S. Cl.
CPC ............. *B23K 9/232* (2013.01); *B23K 9/02* (2013.01); *B23K 33/004* (2013.01); *F16B 5/08* (2013.01); *B23K 2103/04* (2018.08)

(58) Field of Classification Search
CPC .. B23K 9/232; B23K 33/004; B23K 2203/04; B23K 2103/04; B23K 9/02;
(Continued)

(56) References Cited

U.S. PATENT DOCUMENTS 1,903,315 A * 4/1933 Priebe ................ F16L 13/0209
285/22
1,921,242 A    8/1933 Priebe
(Continued)

FOREIGN PATENT DOCUMENTS

CN    102395443 A    3/2012
CN    103008851 A    4/2013
(Continued)

OTHER PUBLICATIONS

PCT/US2015/12907—International Search Report, dated Apr. 15, 2015.
(Continued)

*Primary Examiner* — Matthew R McMahon
(74) *Attorney, Agent, or Firm* — Curatolo Sidoti Co., LPA; Salvatore A. Sidoti

(57) ABSTRACT

A weld with a stepped configuration is provided. The stepped configuration may be machined from a substrate to form a weld preparation which may accommodate a stepped weld. The weld with a stepped configuration and a controlled procedure exhibits improved service life and improved damage tolerance. A welded joint with a stepped configuration, a joined component with a stepped configuration, and method of welding a stepped configuration are also provided.

16 Claims, 5 Drawing Sheets

(51) Int. Cl.
*B23K 9/02* (2006.01)
*F16B 5/08* (2006.01)
*B23K 103/04* (2006.01)

(58) Field of Classification Search
CPC ............. Y10T 403/477; Y10T 403/478; Y10T 403/479; F16B 5/08
USPC ................................ 403/207, 271, 272, 270
See application file for complete search history.

(56) References Cited

U.S. PATENT DOCUMENTS

| | | | |
|---|---|---|---|
| 2,415,987 A | | 2/1947 | Bissout et al. |
| 3,231,338 A | * | 1/1966 | Andrus .................. B21D 51/24 |
| | | | 422/241 |
| 3,506,285 A | | 4/1970 | Coates |
| 4,049,186 A | * | 9/1977 | Hanneman ........... B23K 9/0216 |
| | | | 219/137 WM |
| 4,584,031 A | | 4/1986 | Grützner |
| 4,834,808 A | | 5/1989 | Hill |
| 4,960,562 A | | 10/1990 | Okuda et al. |
| 5,211,909 A | | 5/1993 | Iseda et al. |
| 5,258,600 A | * | 11/1993 | Arthur .................... B23K 31/02 |
| | | | 219/137 R |
| 5,407,635 A | | 4/1995 | Iseda et al. |
| 5,532,454 A | * | 7/1996 | Kuhnen ................ B23K 9/0213 |
| | | | 219/125.11 |
| 5,556,561 A | | 9/1996 | Ishikawa et al. |
| 5,814,274 A | | 9/1998 | Komai et al. |
| 5,945,064 A | | 8/1999 | Komai et al. |
| 6,193,145 B1 | * | 2/2001 | Fournier .............. B23K 9/0213 |
| | | | 228/262.41 |
| 8,561,298 B2 | * | 10/2013 | Morin ....................... C22F 1/10 |
| | | | 29/889.21 |
| 8,729,418 B2 | * | 5/2014 | Brueckner ............. B23K 9/232 |
| | | | 219/61 |
| 8,733,619 B2 | * | 5/2014 | Lalam ................... B23K 9/0282 |
| | | | 228/169 |
| 8,834,168 B2 | * | 9/2014 | Peters ....................... G09B 5/02 |
| | | | 434/219 |
| 8,992,109 B2 | * | 3/2015 | Ishikawa .............. B23K 15/006 |
| | | | 403/270 |
| 9,103,453 B2 | | 8/2015 | Arnold et al. |
| 9,120,184 B2 | * | 9/2015 | Uchida ................. B23K 31/125 |
| 9,211,601 B2 | * | 12/2015 | Hirata ................ B23K 35/3086 |
| 2002/0170634 A1 | | 11/2002 | Kimura et al. |
| 2003/0038167 A1 | | 2/2003 | Komai et al. |
| 2004/0169062 A1 | | 9/2004 | Maruyama et al. |
| 2005/0106012 A1 | | 5/2005 | Scarlin |
| 2009/0224530 A1 | | 9/2009 | Sessions |
| 2011/0158572 A1 | | 6/2011 | Dahlman et al. |
| 2012/0027506 A1 | * | 2/2012 | Yahaba .................. B62D 21/11 |
| | | | 403/270 |
| 2015/0258629 A1 | * | 9/2015 | Radis ................... B23K 20/002 |
| | | | 285/288.1 |

FOREIGN PATENT DOCUMENTS

| | | | |
|---|---|---|---|
| CN | 203067995 U | 7/2013 | |
| GB | 964743 | 7/1964 | |
| JP | S 55-142201 A | 11/1980 | |
| JP | S 56-117899 A | 9/1981 | |
| JP | S62266416 A | 11/1987 | |
| JP | 07-49822 H | 9/1996 | |
| JP | H08243753 A | 9/1996 | |
| JP | H0952183 | 2/1997 | |
| JP | S 5765789 U | 8/2015 | |
| WO | WO-2012096937 A1 * | 7/2012 | ............... B23K 9/23 |
| WO | 2013005570 A1 | 1/2013 | |

OTHER PUBLICATIONS

PCT/US2015/12907—International Written Opinion, dated Apr. 15, 2015.
PCT/US2015/12907—International Preliminary Report on Patentability, dated Mar. 29, 2016.
Sathiya, et al., "Effect Of Shielding Gases On Mechnical And Metallurgical Properties Of Duplex Stainless-Steel Welds", Journal of Materials Science, 2009, Issue 44, pp. 114-121.
Extended European Search Report in EP 15739795.1, dated Oct. 20, 2017.
Office Action Japanese Patent Application No. 2016-548299 dated Nov. 11, 2018.
Office Action Japanese Patent Application No. 2016-548299 dated Aug. 1, 2019.
Office Action Chinese Patent Application No. 2015-800102224 dated Aug. 5, 2019.
Office Action dated Jan. 8, 2019 in corresponding Chinese Patent Application No. 201580010222.4.

* cited by examiner

STEPPED DESIGN WELD JOINT PREPARATION

CROSS REFERENCE TO RELATED APPLICATIONS

This application is a national stage application of International Application No. PCT/US2015/012907, filed 26 Jan. 2015, which claims priority from U.S. Provisional Patent Application No. 61/931,202, filed 24 Jan. 2014, which applications are incorporated herein by reference.

The present disclosure relates to a weld with a stepped weld preparation configuration, a welded joint including the weld, and a method of welding that forms the weld.

Energy production components and boiler components are manufactured from a number of different steels. A typical 500 MW boiler not only contains millions of pounds of various metal grades but also requires tens of thousands of welds to join these materials to one another. A typical weld includes at least one parent (substrate) metal, a heat affected zone (HAZ), and the weld itself. The weld is made up of the parent metal material, consumables from the welding process, and additional materials introduced during the welding process. The HAZ is an area within the parent metal which has the same chemical composition as the parent metal, but a different material microstructure. The different microstructure results from the intense localized heat generated by the welding process.

The alloys used for energy and boiler applications are selected on the basis of factors such as in-service performance and cost. The operating conditions in different boiler components change as the water is converted to steam. Thus, as steam, temperature, and pressure are increased in different system components, commercial power boilers may contain different types of steels to accommodate the different levels of temperature and pressure.

Problems associated with energy production components and boiler components include, but are not limited to, creep deformation and subsequent failure. Creep deformation and damage occurs as a material is subjected to physical and thermal stresses. The exhibited deformation may be elastic, plastic, or even failure, such as cracking. Generally as temperature increases, the rate of creep deformation also increases.

Creep strength enhanced ferritic (CSEF) steels are increasingly used for the fabrication of components which are required to operate for long times under high temperatures and stresses. Experience shows that these components develop cracks and can fail as a direct consequence of local damage in the weld HAZ. Failures can occur at only one tenth of the expected life of the parent material, and may create safety and financial risks. The weld joint designs presently used are currently based on practical manufacturing factors such as: low economic cost, ease of welder access, and time needed to complete a weld. In the event that a component has failed during service, repairs are typically conducted with repair welding to restore the component to use.

Design approaches for the fabrication of pressure boundary welds are typically based on 'design by rule'. The Foreword to ASME Section I states that the objective of the rules is "to afford reasonable protection of life and property and to provide a margin for deterioration in service" so as to give a "reasonably long safe period of usefulness". Section I provides no explicit indication of what constitutes a reasonably long design life. The lack of definition regarding expected performance is due in part to the complexity of the issues which can modify weld joint behavior. Factors affecting behavior include operating stress, operating temperature, component geometry, metallurgy and constituent microstructures, welding process considerations, heat treatment and welding residual stresses, and the relaxation of these stresses. Because of these uncertainties, operators typically have to perform periodic inspections of the parts within a given system (e.g. non-destructive evaluation). The present well-engineered weld design provides a significant improved joint design which is a major benefit to in-service performance and life management, such as assessment by non-destructive evaluation techniques.

Various researchers have attempted to develop new CSEF steels with alternative alloy compositions and subsequent heat treatment schedules in an attempt to minimize or avoid problems associated with premature failing of welds in the HAZ. Adjusting alloy composition and heat treatment schedules has produced only limited success. To date, no one has proposed an engineered approach which controls damage development during service to improve similar or dissimilar CSEF steel weldments.

What is needed is an engineered approach to joint design and fabrication which provides significantly improved in-service performance. The benefits of an improved geometry of weld preparation and a controlled welding procedure offer major benefits to the defect tolerance of pressure boundary welds in boilers which operate under conditions where creep damage can develop. Creep damage generally develops at temperatures above about 40% of the absolute melting temperature.

Figure 1:
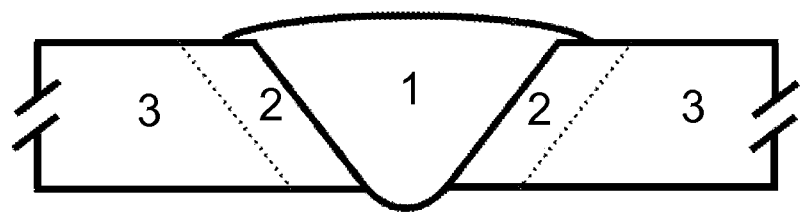
FIG. 1 is a schematic weld profile diagram depicting prior art CSEF weld geometries.

Provided is a steel weld and a welded steel joint. According to certain embodiments, a weld comprises at least one weld preparation having a stepped configuration in a weld zone and a weld material applied to the weld zone. The weld zone may be the localized area affected by a welding process. The weld preparation having a stepped configuration and weld material may coalesce in the weld zone during the welding process. The weld zone may extend adjacently to the weld material and weld preparation in a direction normal to the weld.

According to certain embodiments, the weld preparation having the stepped configuration has been machined from a substrate. The substrate comprises a parent material with at least one substrate edge available for machining. The at least one substrate edge is then machined to produce a stepped configuration. Machining processes may include but are not limited to: grinding, boring, turning, drilling, piercing, sawing, cutting, hydroforming, shaping, flame cutting, arc gouging, and forging. When high removal rate processes such as flame cutting or arc gouging are used, more precise follow up machining may still be needed.

The weld preparation may comprise a substrate having at least one substrate edge machined into a stepped configuration. According to certain embodiments, the stepped configuration comprises more than one step.

The weld preparations may be located on the surface of two different components, or reside within a single component. Weld preparations may be exemplified in a single component via a crack or rupture. Edges of the crack or rupture may be machined to create the stepped weld preparation, and then repair welding may take place.

According to certain embodiments, the weld material is applied to a joint of a plurality of stepped weld preparations to accommodate a stepped weld joint. According to certain embodiments, at least one weld preparation of a plurality of weld preparations differs compositionally from another weld preparation of the plurality of weld preparations. According to certain embodiments, the weld material is substantially the same composition as the at least one weld preparation.

The weld material may be capable of being adapted to fit the weld preparation stepped profile. The weld material may include consumables used in a welding process, parent material from the weld preparation, and additional substrate material and filler material incorporated during the welding process. The additional substrate material and filler material incorporated during the welding process may be of similar composition or dissimilar composition to the parent material from the weld preparation.

According to certain embodiments, the at least one weld preparation and weld material each independently comprises a ferritic material, Grade 11 chromium-molybdenum steel, Grade 12 chromium-molybdenum steel, Grade 22 chromium-molybdenum steel, CrMoV chromium-molybdenum steel, Grade 23 Creep Strength Enhanced Ferritic Steel, Grade 24 Creep Strength Enhanced Ferritic Steel, Grade 91 Creep Strength Enhanced Ferritic Steel, Grade 911 Creep Strength Enhanced Ferritic Steel, Grade 92 Creep Strength Enhanced Ferritic Steel, VM12 Creep Strength Enhanced Ferritic Steel, or Martensitic Microstructure Boron/Nitrogen control steel (MARBN).

According to certain embodiments, the at least one weld preparation and weld material each independently comprises an austenitic stainless steel, Grade 304 stainless steel, Grade 304H stainless steel, Grade 316 stainless steel, Grade 316H stainless steel, Grade 321 stainless steel, Grade 321H stainless steel, Grade 347 stainless steel, Grade 347H stainless steel, Grade 310 stainless steel, Grade 310H stainless steel, 310 HCbN stainless steel, 347HFG stainless steel, Super 304H stainless steel, Tempaloy AA-1 stainless steel, Tempaloy A-3 stainless steel, NF709 stainless steel, or XA704 stainless steel.

Ferritic materials and austenitic stainless steels are of interest for power generation applications. Ferritic materials may include Chromium-Molybdenum (CrMo) Steels and CSEF Steels. Austenitic stainless steels may include conventional or advanced stainless steel alloys. In power generation applications, common practice includes welding different combinations of ferritic materials and austenitic stainless steels together, depending on the demands of the repair or new construction.

According to certain embodiments, the weld comprises a nickel based alloy. The weld may include weld metal added by external sources such as manual and/or automated feed wire, weld rod, or electrodes. For new construction between weld preparations of similar compositions, an alloy or filler material of composition identical to the parent materials may be added to the weld. For new construction between dissimilar weld preparations, the choice of an alloy or filler material depends on the component; material combinations, such as dissimilar ferritic components and the repair of ferritic components; and the expected weld behavior between the material combinations. Generally for a new construction between ferritic materials and austenitic stainless steels, a nickel based alloy or filler material is used when following American Welding Society (AWS) standards.

According to certain embodiments, the weld preparation comprises a thickness, T; a depth of step, $t_s$; a step angle, $\alpha$; and a step width, w. The thickness, T, may be in a range from about 6 mm (0.25 inches) to about 250 mm (10 inches). The depth of step, $t_s$, may be in a range from about 25% of thickness T to about 75% of thickness T, optionally in a range from about 25% of thickness T to about 50% of thickness T. The step angle, $\alpha$, may be about 0 to about 90 degrees from a vertical axis, wherein the vertical axis is substantially parallel to thickness T. The step width may vary according to the number of steps and thickness of the component. The step width, w, may be in a range from about 3.8 mm (0.15 inches) or 4.00 mm (0.156 inches) to about 19 mm (0.75 inches). According to certain illustrative embodiments, the step width, w, may be at least about 6 mm (0.24 inches).

The depth of step, $t_s$, may depend on the component and the number of steps. Generally, a thicker component may include more steps in the weld preparation than a thin component.

The step angle, $\alpha$, may vary depending on the application for access to the weld location, the welding process to be used, and other considerations, such as controlling welding heat input, weld microstructure, and the resulting residual stress state created by the welding process.

The step width, w, may have a minimum dimension of about the width of the HAZ, and a maximum dimension of about the thickness, T, of the given component. In certain embodiments, the step width may be at least about equal to the width of the HAZ. Without wishing to be limited by theory, it is believed that if the step width is smaller than the width of the HAZ, the benefits of the present subject matter may not be achieved, because the step width may be too narrow to halt or diminish creep crack propagation. The width of the HAZ may be determined by those of ordinary skill in the art, using known methods.

Different weld designs and step configurations may be needed to improve damage tolerance based on the thickness, T. T may be very small in applications such as reheater tubing, but may be much larger for components like vessels or high pressure tubing, piping, or headers.

The weld preparation having a stepped configuration may be realized with a series of offset areas. Each offset area may be defined by the depth of step, step angle, and step width. The offset areas may comprise planar, curved, or faceted surfaces. Multiple offset areas may be employed to create a stepped or staggered configuration through the thickness of a weld preparation.

According to certain embodiments, the weld is capable of operation within a material creep temperature regime. In the material creep temperature regime, cracks may develop in the HAZ. According to illustrative embodiments, crack propagation in the HAZ may be controlled through the inclusion of a weld preparation in a stepped configuration. Instead of cracking directly through the HAZ in a largely linear fashion, the illustrative embodiments force crack propagation to alter direction at least once, if not several times. Therefore, welds according to the present embodiments exhibit improved service life over welds which are currently employed.

According to certain embodiments, a welded joint comprises at least two weld preparations and a weld as described above. According to certain embodiments, the welded joint is capable of operation within a material creep temperature regime. According to further embodiments of the welded joint, at least one weld preparation of the at least two weld preparations comprises a high energy boiler component, such as at least one of a header, piping, tubing, an attachment weld, a tee, a valve, a flow nozzle, or a vessel.

Welded joints are locations or edges where at least one piece of material is joined to at least one other piece of material. A welding process may be used to join the separate pieces of material in a particular geometry, dependent on the desired end use. Typically, welded joints are used in the preparation of structural shapes. According to the AWS, welded joints are characterized in five types: butt, corner, edge, lap, and tee joints. Each of the five general welded joint types may have several different configurations.

The welded joint may comprise a repair weld in a single high energy boiler component or a weld of two separate high energy boiler components together. In a single component, the repair weld may be used to remove a defect or to repair a crack or rupture. When two separate components are welded together, the joint may comprise the interface between the two components.

According to certain embodiments, a joined component comprises at least two weld preparations having the welded joint. The joined component may be a single high energy boiler component with a repair weld. The joined component may also be at least two high energy boiler components welded together. Non-limiting illustrative examples of at least two high energy boiler components welded together include piping systems, tubing systems, headers, manifolds, attachment welds for piping or tubing, tees welded to piping or tubing, valves welded to piping or tubing, flow nozzles welded to piping or tubing, and/or vessels welded to piping or tubing.

Also provided is a method of welding steel. According to certain embodiments, a method of welding at least one substrate comprises preparing at least one substrate having a stepped configuration; applying a weld material to a substrate having a stepped configuration, and welding the weld material and at least one substrate to form a weld. According to certain embodiments, a method of welding at least one substrate comprises applying a weld material to a substrate having a stepped configuration and welding the weld material and at least one substrate to form a weld. In certain embodiments, the substrate may be prepared to have a stepped configuration. According to certain embodiments, the stepped configuration comprises more than one step.

Welding is a process of joining similar or dissimilar materials. Heat or pressure are applied to substrate materials until the substrates melt and coalesce together, optionally with a filler material. Welding stands in contrast to brazing or soldering in that the substrate materials are actually melted together, rather than simple mechanical joining. Welding processes can be accomplished using metals, plastics, flux materials, gases, consumable filler materials, electricity, lasers, and even electron beams.

According to certain embodiments, suitable welding techniques may comprise Gas Tungsten Arc Welding (GTAW), Shielded Metal Arc Welding (SMAW), Gas Metal Arc Welding (GMAW), Flux Cored Arc Welding (FCAW), or Submerged Arc Welding (SAW).

According to certain embodiments, the welding comprises conventional welding or temper bead welding techniques. Conventional welding may apply to new construction applications. Generally, conventional welding is done as quickly as possible with less consideration given to filling a weldment.

Repair welding may require more consideration given to filling a weldment, and may be more time consuming Repair welding may include a specialized welding technique referred to as temper bead welding or controlled fill welding. Temper bead welding may fall into either half-bead or butter-bead techniques. Controlled fill welding includes a technique whereby a machined groove is welded using a restricted heat input, such as by limiting electrode size and utilizing stringer weld beads, and the fill passes may be deposited starting on a bevel and welding towards the inside of the machined groove.

In the half-bead technique, some of the deposited weld metal is removed, typically by grinding, prior to the deposition of a subsequent filler material layer.

In the butter-bead technique, buttering layers are deposited and tempered by subsequent layers using controlled welding procedures and parameters. The buttered layer may be the same material as the substrate or the weld material, or a different material than the substrate or weld material. Butter-bead welding may be accomplished by increasing heat input between layers or increasing electrode size, such as in the SMAW process.

Post weld heat treatments may be required after a welding procedure. Some welded components, weld geometries, and weld materials may include residual stresses after undergoing a welding procedure. Post weld heat treatments may be employed to relieve the residual stresses and bring the properties of welded materials back within a desired range. Post weld heat treatments include, but are not limited to: annealing, normalizing, and tempering. According to certain embodiments, a stepped weld design may reduce or eliminate the requirement for post weld heat treatments.

FIG. 1 shows a prior art weld profile between two substrates which have been welded together. The weld 1 joins the metallic substrate(s) 3 after undergoing a welding procedure. The orientation of heat affected zone 2 of the metallic substrate 3 is random with respect to the weld geometry. The orientation of weld 1 is also random with respect to the weld geometry.

Figure 2:
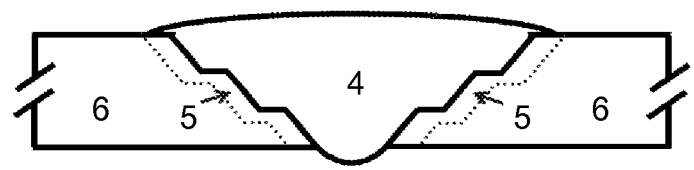
FIG. 2 is a schematic weld profile diagram depicting an illustrative embodiment for weld geometries.

FIG. 2 shows an illustrative embodiment of a weld profile of the present engineered weld. Weld 4 joins the weld preparation(s) 6 after undergoing a welding procedure. As a result of the engineering involved in designing the weld preparation with a stepped configuration, the heat affected zone 5 also assumes a stepped configuration. As a result, weld 4 is adapted to fit the stepped configuration of weld preparation 6.

An unexpected advantage of the stepped weld design is that the microstructure of heat affected zone 5, location of heat affected zone 5, and rate of damage development in heat affected zone 5 are all controlled. As shown in the prior art weld profile of FIG. 1, the heat affected zone 2 is aligned.

Thus, creep damage in the weld profile according to FIG. 1 would propagate rapidly along local creep weak regions. Creep damage in the weld profile according to FIG. 2 is localized in specific regions. The stepped configuration of FIG. 2 isolates regions susceptible to creep induced cracking, and thus the damage development and crack propagation is different for the specific microstructures, namely heat affected zone 5 and weld preparation 6.

Under creep conditions, damage may only propagate in a direction which is normal with respect to the axis of stress. The stepped configuration shown in FIG. 2 means damage formed at one location in heat affected zone 5 can only propagate through weld preparation 6. The weld preparation 6 has superior material properties over heat affected zone 5, and therefore weld performance is improved. As the weld performance is improved, creep damage propagation is better controlled, and the service life of the weld is lengthened. Weld designs with a stepped configuration may exhibit a service life about twice as long as prior art weld designs.

Figure 3:
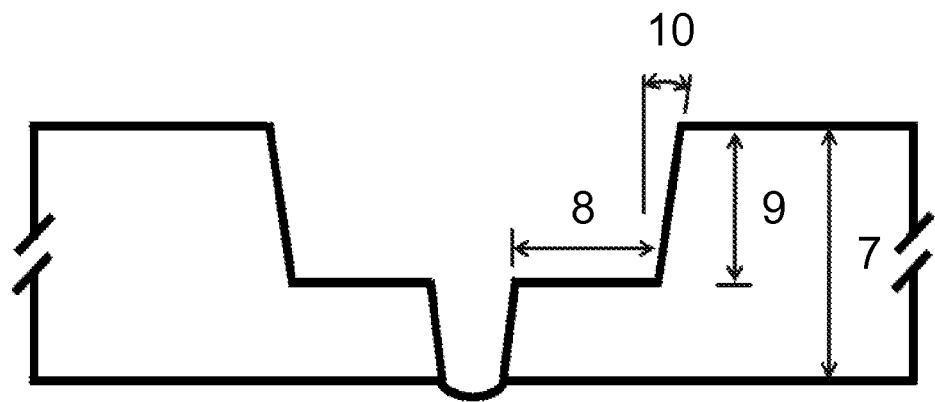
FIG. 3 is a schematic diagram depicting an illustrative embodiment for a weld preparation in a stepped configuration.

Now referring to FIG. 3, an illustrative embodiment of a weld preparation is shown. The weld preparation has a thickness 7, a width of step 8, a depth of step 9, and a step angle 10. The weld preparation may have at least one step as part of the stepped configuration.

The following examples are set forth merely to further illustrate the present subject matter. The illustrative examples should not be construed as limiting the subject matter in any manner.

The following examples and comparative examples were tested in accordance with common conventional weld experimentation. Creep specimens were machined from fabricated weldments. The specimens had a gauge cross-section of about 50 mm (2 inches) through the thickness of the sample and about 12.7 mm (0.50 inch) through the width of the sample. The gauge length was sufficient to include both fusion lines, and both HAZs, and was about 150 mm (6 inches) long. The gauge length was sufficient to provide metallographic analysis of the failure location as well as damage assessment in the unfailed HAZ. The total area of the gauge cross-section in the samples used was about 500 mm² (0.80 inch).

All specimens were removed from the approximate center in the through thickness of the weld so that the test pieces included the weld without the cap (outer edge) and root/backing bar region (inner edge).

All testing was conducted using constant load machines under conditions of about 625° C. (1157° F.) and about 80 MPa (11.6 ksi). These testing parameters have been shown to result in a HAZ failure in typical Grade 91 steel samples with cross-weld creep lives of around 3,000 to 5,000 hours. Weldments were taken to either 100% rupture or about 99% of life. For weldments which did not completely rupture, testing was terminated upon indication of tertiary creep as the strain was continuously monitored during testing.

Data recorded during each creep test included extension from two sides of an extensometer which extended over the total gauge length, a calculated average extension, time to rupture, and temperature. Initially, the average extension has been used to calculate creep strain based on the full original gauge length. However, it is apparent that when deformation occurs locally in the HAZ, this approach underestimates the actual local strain values.

Comparative Example 1

Figure 4:
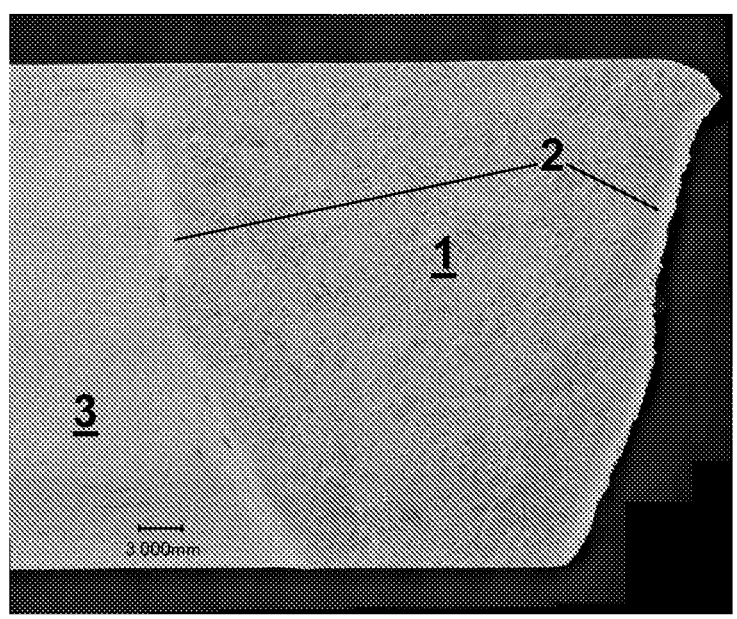
FIG. 4 is a photomicrograph depicting the crack propagation/failure profile of a conventional CSEF weld geometry.

Comparative Example 1 was a Grade 91 Creep Strength Enhanced Ferritic Steel with a conventional weld geometry. As depicted in FIG. 4, Comparative Example 1 shows creep cracking and failure in a heat affected zone 2, adjacent weld 1. Comparative Example 1 was tested in accordance with the testing procedure discussed above.

Referring to FIG. 4, shown is a photomicrograph depicting the crack propagation and failure profile of a conventional Creep Strength Enhanced Ferritic steel weld geometry. Weld 1 is shown, bordered by heat affected zone 2. Metallic substrate 3 is adjacent heat affected zone 2 on one side of weld 1. However a crack formed in heat affected zone 2 severing the metallic substrate to the right side of heat affected zone 2. The crack propagated through the entire component.

Example 2

Figure 5:
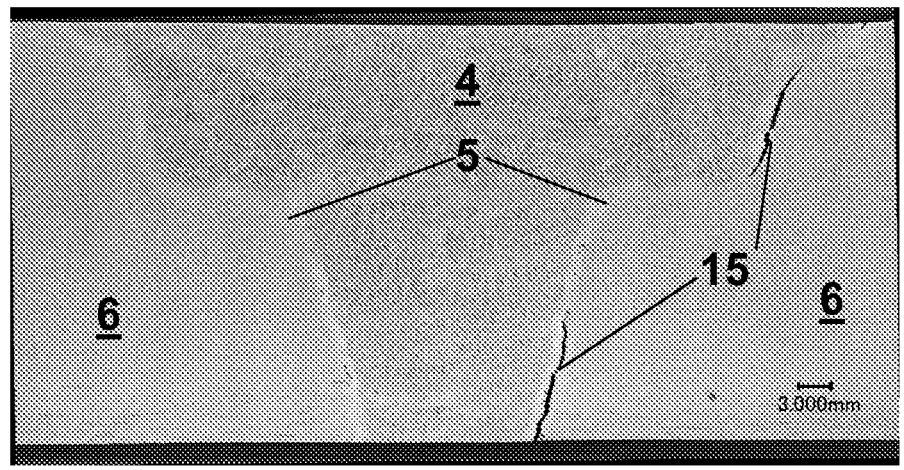
FIG. 5 is a photomicrograph depicting the crack propagation profile of a stepped weld preparation according to an illustrative embodiment.

Example 2 was a Grade 91 Creep Strength Enhanced Ferritic Steel with a stepped weld geometry according to an illustrative embodiment. As depicted in FIG. 5, Example 2 shows creep cracking 15 in heat affected zone 5, but no failure of the component. Example 2 was tested in accordance with the testing procedure discussed above.

Referring to FIG. 5, shown is a photomicrograph depicting the crack propagation profile of a stepped weld preparation according to an illustrative embodiment. Weld 4 joins weld preparations 6. Heat affected zone 5 assumes a stepped profile between weld 4 and weld preparations 6. Cracks 15 have propagated partially through the component. However, it is seen that the stepped orientation of weld preparation 6 has prevented the cracks 15 from propagating through the entire component.

Figure 6:
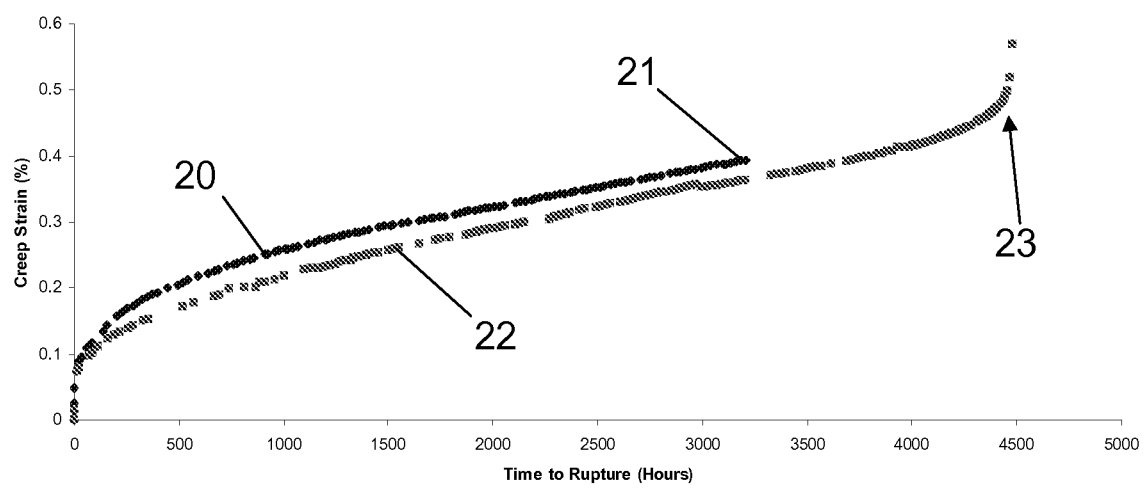
FIG. 6 is a graphical representation of creep strain versus time achieved by the use of an illustrative embodiment of a stepped weld preparation compared to a weld sample with a conventional weld geometry.

Referring to FIG. 6, a graphical representation of creep strain versus time comparing Comparative Example 1 and Example 2 is shown. Creep strain was measured on a Grade 91 Creep Strength Enhanced Ferritic steel under a temperature of 625° C. (1157° F.) and a pressure of 80 MPa (11.6 ksi). Comparative Example 1 was welded with a conventional weld geometry, and the Example 2 was welded with a stepped profile comprising a single step at ⅓ the thickness, and a 10 mm (0.40 in) step width.

Still referring to FIG. 6, data series 20 shows the creep strain profile of Comparative Example 1. At failure point 21, the crack has propagated through the sample, and the weld ruptured. Data series 22 shows the creep strain profile of Example 2. The data reveal that the stepped weld geometry exhibits nearly a 50% increase in service life.

Further, creep strain is known to exhibit three phases: primary, secondary, and tertiary. The conventional weld ruptured at failure point 21 in the secondary creep stage. Example 2 survived long enough to exhibit tertiary creep behavior 23, after fully passing a secondary creep stage.

In cases where there is greater damage tolerance, even when a crack is formed, energy is required to drive the crack through the specimen. Simple engineering principles indicate that the favored path for this crack propagation is across the remaining ligament perpendicular to the applied stress. As the crack grows the net section ahead of the crack decreases and, when a constant load is applied to the specimen, there will be a gradual increase in the stress on this ligament. Typically for situations of good toughness these effects will lead to a gradual increase in the measured strain versus time. This period of increasing creep rate is typically referred to as "tertiary creep".

In general, having a clear period of tertiary creep is evidence of fracture processing becoming dominant and the extent of tertiary creep is an indication of the damage tolerance of a structure. In the step welds according to the illustrative embodiments, the period of tertiary creep is linked to the 'net section' crack path being through the base steel which has a high resistance to creep damage. Thus, significant energy is required to propagate the crack through the base material. This causes the crack to open during the growth process and in extreme cases the crack opening is sufficient that the test must be terminated prior to failure due to equipment limitations. In cases where the test is terminated prior to complete failure, it is accepted that the test completion time is nearly identical to the time to failure.

Comparative Example 3

Figure 7:
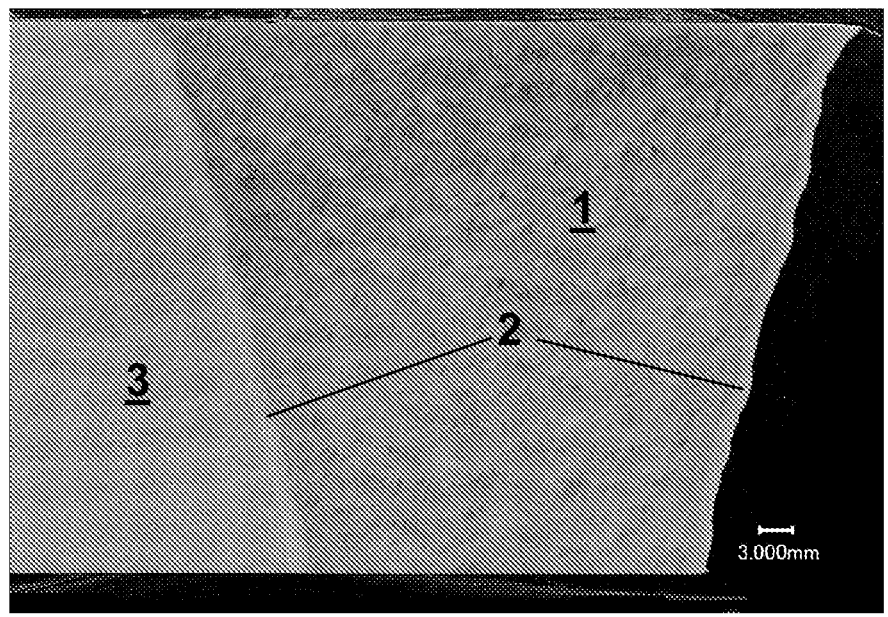
FIG. 7 is a photomicrograph depicting the crack propagation/failure profile of a conventional CSEF weld geometry.

Comparative Example 3 was a Grade 91 Creep Strength Enhanced Ferritic Steel with a conventional weld geometry. As depicted in FIG. 7, Comparative Example 3 shows creep cracking and failure in a heat affected zone 2, adjacent weld 1. Comparative Example 3 was tested in accordance with the testing procedure discussed above.

Referring to FIG. 7, shown is a photomicrograph depicting the crack propagation and failure profile of a conventional Grade 91 Creep Strength Enhanced Ferritic steel weld geometry. Weld 1 is shown, bordered by heat affected zone 2. Metallic substrate 3 is adjacent heat affected zone 2 on one side of weld 1. However a crack formed in heat affected zone 2 severing the metallic substrate to the right of heat affected zone 2. The crack propagated through the entire component.

Example 4

Figure 8:
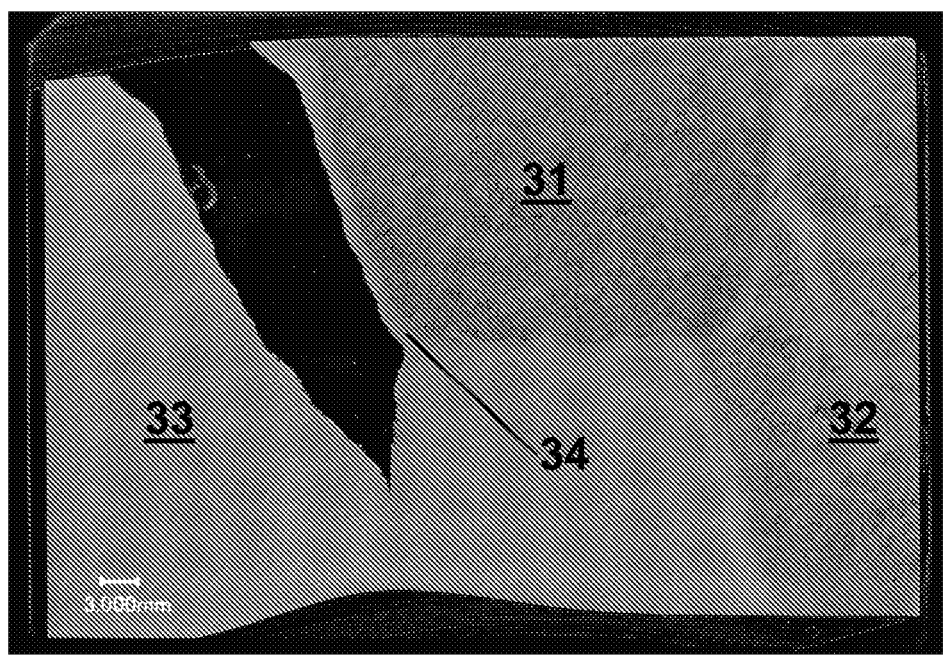
FIG. 8 is a photomicrograph depicting the crack propagation profile of a stepped repair weld preparation according to an illustrative embodiment.

Example 4 was a Grade 91 Creep Strength Enhanced Ferritic Steel with a stepped repair weld geometry according to an illustrative embodiment. As depicted in FIG. 8, Example 4 shows creep cracking in heat affected zone 34 and weld preparation 33, but no failure of the component. Example 4 was tested in accordance with the testing procedure discussed above.

Referring to FIG. 8, shown is a photomicrograph depicting the crack propagation of a stepped repair weld preparation according to an illustrative embodiment in the Grade 91 Creep Strength Enhanced Ferritic steel of Example 4. Original weld 32 appears on the right. Repair weld 31 was introduced using a stepped profile relative to original weld 32. A crack initiated in heat affected zone 34 adjacent stepped weld preparation 33. Due to the stepped nature of the weld geometry, the crack could not propagate through the pressure boundary of the heat affected zone 34. Instead, the crack propagated through the weld preparation 33 base material, rather than proceeding quickly through the remainder of the heat affected zone 34.

Figure 9:
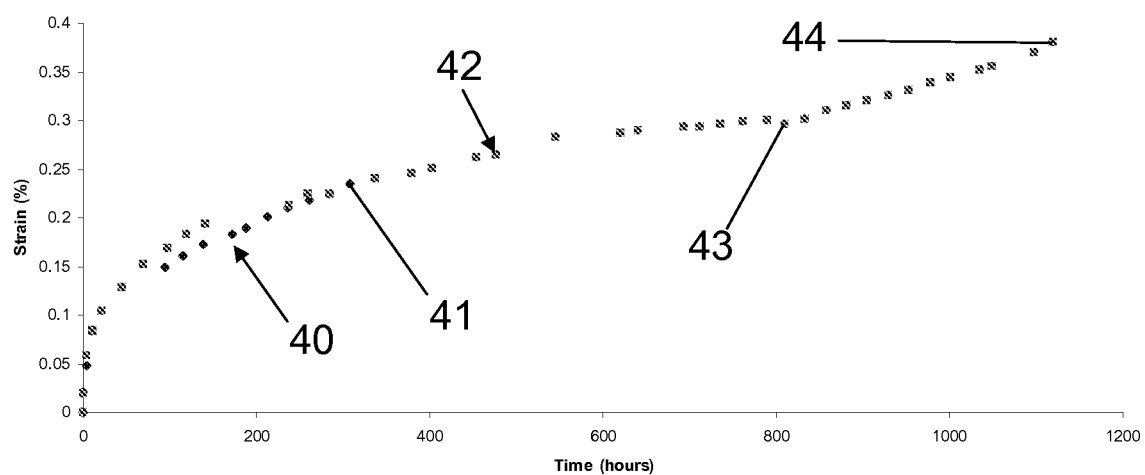
FIG. 9 is a graphical representation of a strain versus time achieved by the use of an illustrative embodiment of a stepped repair weld preparation compared to a weld sample with a conventional weld geometry.

Referring to FIG. 9, a graphical representation of strain versus time comparing Comparative Example 3 and Example 4 is shown. Creep strain was measured on a Grade 91 Creep Strength Enhanced Ferritic steel.

Still referring to FIG. 9, data series 40 shows the creep strain profile for Comparative Example 3. At failure point 41, the crack has propagated through the sample, and the weld ruptured. Data series 42 shows the creep strain profile for Example 4. The data reveal that the stepped weld geometry exhibits primary, secondary, and tertiary creep.

At point 43 of the data series 42 for the stepped weld design sample, secondary creep has ended. Up until this point, damage development was not sufficient to modify the approximately steady state of creep. Beyond point 43, tertiary creep was initiated along with non-steady state crack propagation. At point 44, tertiary creep ceased and the weld sample failed.

In a first embodiment of the present subject matter, a weld comprises at least one weld preparation having a stepped configuration in a weld zone and a weld material applied to the weld zone.

In the weld of the first embodiment, the weld preparation having the stepped configuration may be machined from a substrate.

In the weld of any of the first or subsequent embodiments, the weld material is applied to a joint of a plurality of weld preparations to accommodate a stepped weld joint.

In the weld of any of the first or subsequent embodiments, at least one weld preparation of the plurality of weld preparations differs compositionally from another weld preparation of the plurality of weld preparations.

In the weld of any of the first or subsequent embodiments, the weld material is substantially the same composition as the at least one weld preparation.

In the weld of any of the first or subsequent embodiments, the at least one weld preparation and weld material each independently comprises a ferritic material, Grade 11 chromium-molybdenum steel, Grade 12 chromium-molybdenum steel, Grade 22 chromium-molybdenum steel, CrMoV chromium-molybdenum steel, Grade 23 Creep Strength Enhanced Ferritic Steel, Grade 24 Creep Strength Enhanced Ferritic Steel, Grade 91 Creep Strength Enhanced Ferritic Steel, Grade 911 Creep Strength Enhanced Ferritic Steel, Grade 92 Creep Strength Enhanced Ferritic Steel, VM12 Creep Strength Enhanced Ferritic Steel, or Martensitic Microstructure Boron/Nitrogen control steel (MARBN).

In the weld of any of the first or subsequent embodiments, the at least one weld preparation and weld material each independently comprises an austenitic stainless steel, Grade 304 stainless steel, Grade 304H stainless steel, Grade 316 stainless steel, Grade 316H stainless steel, Grade 321 stainless steel, Grade 321H stainless steel, Grade 347 stainless steel, Grade 347H stainless steel, Grade 310 stainless steel, Grade 310H stainless steel, 310 HCbN stainless steel, 347HFG stainless steel, Super 304H stainless steel, Tempaloy AA-1 stainless steel, Tempaloy A-3 stainless steel, NF709 stainless steel, or XA704 stainless steel.

In the weld of any of the first or subsequent embodiments, the weld further comprises a nickel based alloy.

In the weld of any of the first or subsequent embodiments, the weld preparation comprises a thickness, T; a depth of step, $t_s$; a step angle, $\alpha$; and a step width, w. The thickness, T, may be in a range from about 6 mm (0.25 inches) to about 250 mm (10 inches); and/or, the depth of step, $t_s$, may be in a range from about 25% of thickness T to about 75% of thickness T, optionally in a range from about 25% of thickness T to about 50% of thickness T; and/or, step angle $\alpha$ may be 0 to about 90 degrees from a vertical axis, wherein the vertical axis is substantially parallel to thickness T; and/or, the step width, w, may be in a range from about 3.8 mm (0.15 inches) to about 19 mm (0.75 inches). The step width may vary according to the number of steps and thickness of the component.

In the weld of any of the first or subsequent embodiments, the stepped configuration comprises more than one step.

In the weld of any of the first or subsequent embodiments, the weld is capable of operation within a material creep temperature regime.

In a second embodiment of the present subject matter, a welded joint of at least two weld preparations is provided, comprising the weld as defined in any one of the first or subsequent embodiments.

In the welded joint of the second embodiment, the welded joint is capable of operation within a material creep regime.

In the welded joint of any of the second or subsequent embodiments, at least one weld preparation of the at least two weld preparations comprises a high energy boiler component, optionally at least one of a header, piping, tubing, an attachment weld, a tee, a valve, a flow nozzle, or a vessel.

In a third embodiment of the present subject matter, a joined component comprising at least two weld preparations is provided, comprising the weld of any of the first or subsequent embodiments or the welded joint of any one of the second or subsequent embodiments.

In a fourth embodiment of the present subject matter, a method of welding at least one substrate is provided, comprising preparing at least one substrate having a stepped configuration; applying a weld material to a substrate having a stepped configuration, and welding the weld material and at least one substrate to form a weld as defined in any one of the first or subsequent embodiments.

In a fifth embodiment of the present subject matter, a method of welding at least one substrate is provided, comprising applying a weld material to a substrate having a stepped configuration and welding the weld material and at least one substrate to form a weld as defined in any one of the first or subsequent embodiments.

In the method of welding of any of the fifth or subsequent embodiments, the substrate may be prepared to have at stepped configuration.

In the method of welding of any of the fourth, the fifth, or subsequent embodiments, the welding comprises Gas Tungsten Arc Welding (GTAW), Shielded Metal Arc Welding (SMAW), Gas Metal Arc Welding (GMAW), Flux Cored Arc Welding (FCAW), or Submerged Arc Welding (SAW).

In the method of welding of any of the fourth, the fifth, or subsequent embodiments, the welding comprises conventional welding or temper bead welding techniques.

It will be understood that the embodiments described herein are merely illustrative, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A stepped weld joint comprising a plurality of weld preparations having a stepped configuration in a weld zone, and a stepped weld comprising a weld material applied to the weld zone; wherein at least one of the plurality of weld preparations comprises:
   a thickness, T;
   a depth of step, $t_s$, wherein $t_s$ is in a range from about 25% of T to about 75% of T;
   a step angle, $\alpha$; and
   a step width, w, wherein w is at least about equal to the width of a heat affected zone of the weld.

2. The stepped weld joint of claim 1 wherein w is at least about 6 mm.

3. The stepped weld joint of claim 1 wherein at least one weld preparation of the plurality of weld preparations differs compositionally from another weld preparation of the plurality of weld preparations.

4. The stepped weld joint of claim 1 wherein the plurality of weld preparations and weld material each independently comprise a ferritic material, Grade 11 chromium-molybdenum steel, Grade 12 chromium-molybdenum steel, Grade 22 chromium-molybdenum steel, CrMoV chromium-molybdenum steel, Grade 23 Creep Strength Enhanced Ferritic Steel, Grade 24 Creep Strength Enhanced Ferritic Steel, Grade 91 Creep Strength Enhanced Ferritic Steel, Grade 911 Creep Strength Enhanced Ferritic Steel, Grade 92 Creep Strength Enhanced Ferritic Steel, VM12 Creep Strength Enhanced Ferritic Steel, Martensitic Microstructure Boron/Nitrogen control steel, an austenitic stainless steel, Grade 304 stainless steel, Grade 304H stainless steel, Grade 316 stainless steel, Grade 316H stainless steel, Grade 321 stainless steel, Grade 321H stainless steel, Grade 347 stainless steel, Grade 347H stainless steel, Grade 310 stainless steel, Grade 310H stainless steel, 310 HCbN stainless steel, 347HFG stainless steel, Super 304H stainless steel, Tempaloy AA-1 stainless steel, Tempaloy A-3 stainless steel, NF709 stainless steel, or XA704 stainless steel.

5. The stepped weld joint of claim 1 wherein the stepped weld further comprises a nickel based alloy.

6. The stepped weld joint of claim 1, wherein a) T is in a range from about 6 mm to about 250 mm; and/or, b) $t_s$ is in a range from about 25% of T to about 50% of T; and/or, c) $\alpha$ is 0 to about 90 degrees from a vertical axis; and/or, d) w is in a range from about 3.8 mm to about 19 mm.

7. The stepped weld joint of claim 1, wherein the stepped configuration comprises more than one step.

8. The stepped weld of claim 1, wherein the heat affected zone of the stepped weld preparations has a stepped configuration.

9. The stepped weld joint of claim 1, comprising at least two stepped weld preparations.

10. The stepped weld joint of claim 9, wherein at least one weld preparation of the at least two weld preparations comprises a high energy boiler component.

11. The stepped weld joint of claim 9, wherein at least one weld preparation of the at least two weld preparations comprises at least one of a header, piping, tubing, an attachment weld, a tee, a valve, a flow nozzle, or a vessel.

12. A joined component comprising at least two weld preparations having a stepped weld joint according to claim 9.

13. A method of welding at least two substrates comprising:
    applying a weld material to a plurality of substrates having a stepped configuration; and
    welding the weld material and the plurality of substrates to form a stepped weld joint according to claim 1 wherein the plurality of substrates having a stepped configuration comprise a thickness, T; a depth of step, $t_s$; a step angle, $\alpha$; and a step width, w, wherein w is at least about equal to the width of a heat affected zone of the weld, and wherein $t_s$ is in a range from about 25% of T to about 75% of T.

14. The method of claim 13 wherein the welding comprises Gas Tungsten Arc Welding, Shielded Metal Arc Welding, Gas Metal Arc Welding, Flux Cored Arc Welding, or Submerged Arc Welding.

15. A method of welding at least two substrates comprising:
    preparing the at least two substrates having a stepped configuration in a weld zone;
    applying a weld material to the weld zone of the substrates; and
    welding the weld material and the substrates to form a stepped weld; wherein the at least two substrates having a stepped configuration comprise a thickness, T; a depth of step, $t_s$;

a step angle, $\alpha$; and a step width, w, wherein w is at least about equal to the width of a heat affected zone of the weld, and wherein $t_s$ is in a range from about 25% of T to about 75% of T.

16. The method of claim 15 wherein the welding comprises Gas Tungsten Arc Welding, Shielded Metal Arc Welding, Gas Metal Arc Welding, Flux Cored Arc Welding, or Submerged Arc Welding.

\* \* \* \* \*